United States Patent
Banba et al.

(10) Patent No.: US 7,077,355 B2
(45) Date of Patent: Jul. 18, 2006

(54) SPLIT-TYPE STATOR CORE WINDING DEVICE

(75) Inventors: Hideki Banba, Tsurugashima (JP);
Takanori Fujii, Tsurugashima (JP);
Takeo Fukushima, Tsurugashima (JP)

(73) Assignee: Toyo Denso Kabushiki Kaisha (JP)

( * ) Notice: Subject to any disclaimer, the term of this patent is extended or adjusted under 35 U.S.C. 154(b) by 0 days.

(21) Appl. No.: 10/953,713

(22) Filed: Sep. 28, 2004

(65) Prior Publication Data

US 2006/0071114 A1   Apr. 6, 2006

(51) Int. Cl.
*H02K 15/09* (2006.01)

(52) U.S. Cl. .................................. 242/433.4

(58) Field of Classification Search ............... 242/433, 242/433.2, 433.4, 434.9
See application file for complete search history.

(56) References Cited

FOREIGN PATENT DOCUMENTS

| JP | 405292708 A | * | 11/1993 |
| JP | 2002-64962 | | 2/2002 |
| JP | 2003-199270 | | 7/2003 |
| JP | 2004274980 A | * | 9/2004 |
| JP | 02004312933 A | * | 11/2004 |
| JP | 02005020972 A | * | 1/2005 |

OTHER PUBLICATIONS

English Language Abstract of JP 2003-199270.

* cited by examiner

*Primary Examiner*—Emmanuel M Marcelo
(74) *Attorney, Agent, or Firm*—Fulbright & Jaworski L.L.P.

(57) ABSTRACT

A split type stator core winding device which can continuously form windings on each of divided core elements assembled in a single stator core having a small gaps between large claws of adjacent core elements by stepwise feeding the stator core per magnet pole (core element) by rotation of the driving shaft and by passing a copper wire through a gap between claws of adjacent core elements and placing windings on each magnetic pole (core element), which is provided with means for expanding outward a part of the stator core assembled of core elements each being movable in a specified range in the circumferential direction in synchronism with rotation of the driving shaft holding the stator core.

2 Claims, 10 Drawing Sheets

SPLIT-TYPE STATOR CORE WINDING DEVICE

BACKGROUND OF THE INVENTION

The present invention relates to a winding device for winding a split-type stator core of a rotating electric machine of an outer rotor type.

Japanese Laid-Open Patent Publication No. 2001-402936 assigned to the assignee of this patent application discloses a prior method of winding a split stator core of an outer rotor type rotating electric machine, whereby the stator core can be easily assembled at a time in a state that a plurality of core elements 4 are arranged in a circular form in such a manner that the core elements divided into magnetic pole units each composed of a yoke 1, a magnetic pole 2 and a claw 3 can be coupled with one another at yokes 1 allowing shifting each unit in a specified range in the circumferential direction as shown in FIGS. 1 to 4.

Figure 1:
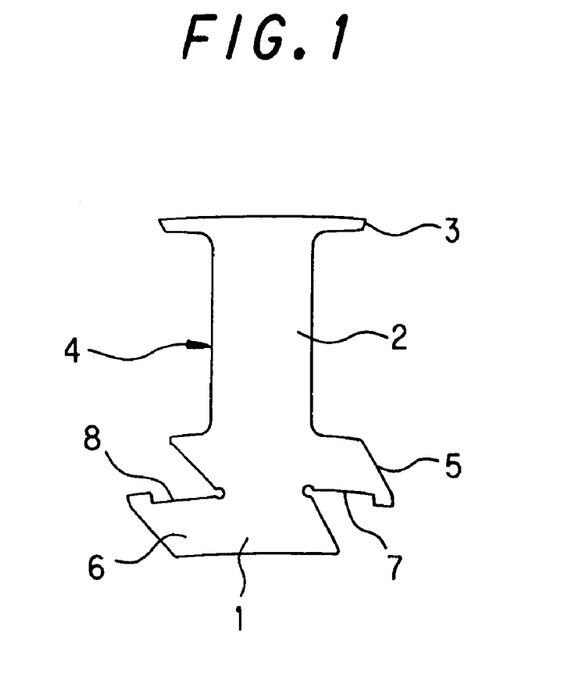
FIG. 1 is a front view showing a basic shape of an element of a split stator core composed of divided core elements arranged to form a ring in which each element can be moved in a specified range in the circumferential direction to engage with neighbors to form a single stator core.
Figure 2:
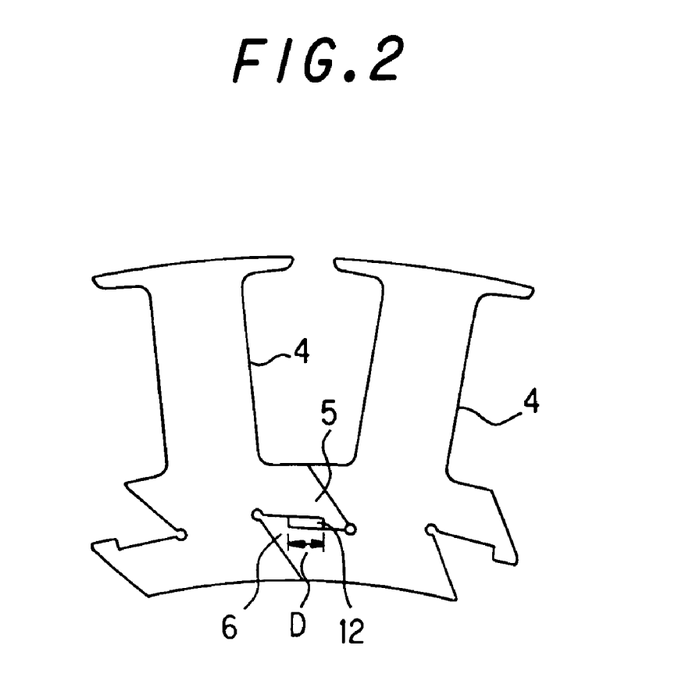
FIG. 2 is a front view showing two core elements engaging with each other at their upward and downward projecting arms.

Each core element 4 is provided with a downward projecting arm 5 at a lower part on one side of the yoke 1 and an upward projecting arm 6 at an upper part on the other side. The downward projecting arm 5 has a notch 7 and the upward projecting arm 6 has a notch 8. As shown in FIG. 2, adjacent core elements 4 can be coupled with each other by engaging the downward projecting arm 5 of one element with the upward projecting arm 6 of the other element in the state allowing mutually sliding in a specified range D in the adjoining (circumferential) direction.

Figure 3:
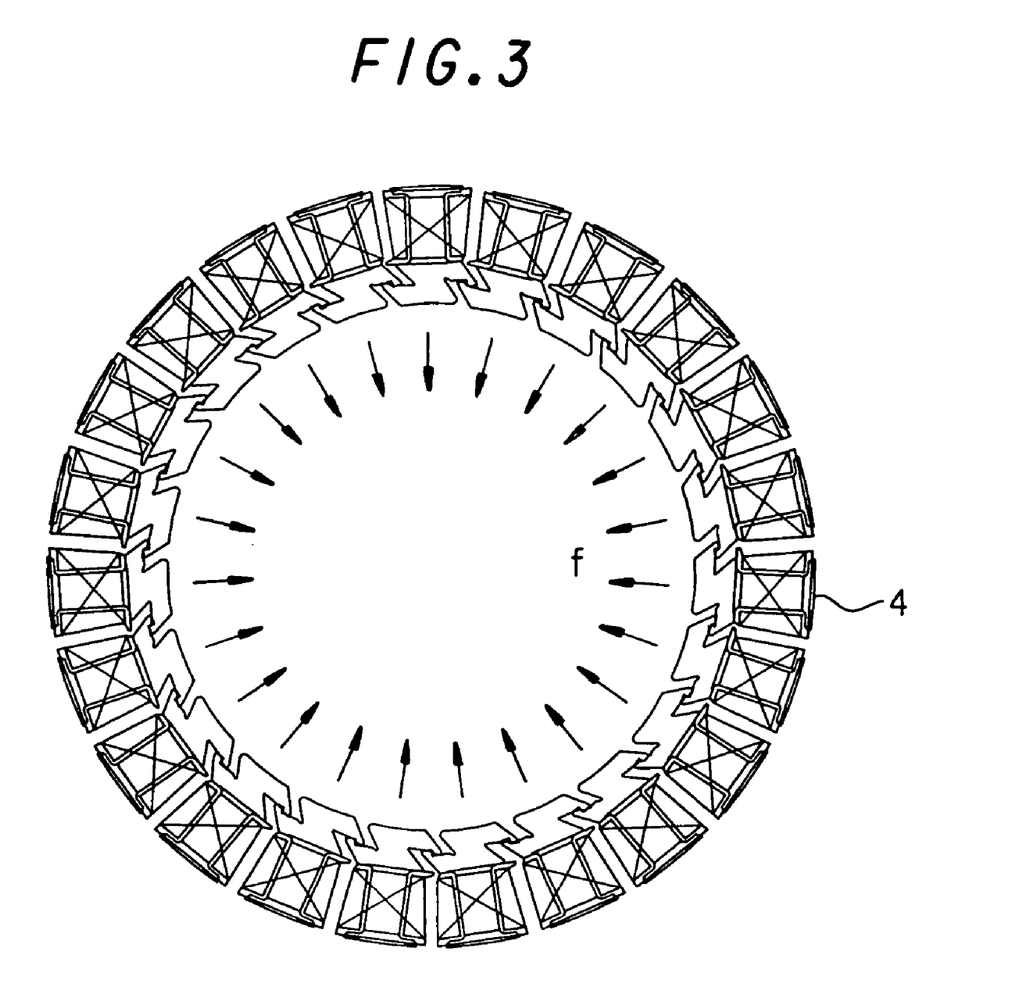
FIG. 3 is a front view showing a plurality of core elements arranged in a circular form.
Figure 4:
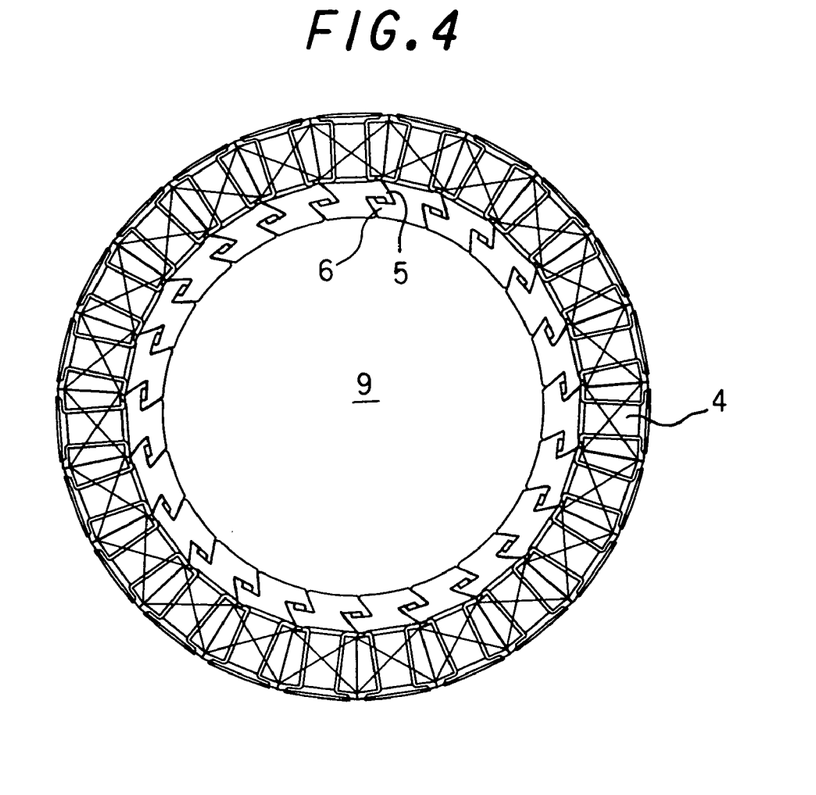
FIG. 4 is a front view showing a plurality of core elements arranged in circular form and coupled with one another to form a single core unit.
Figure 5:
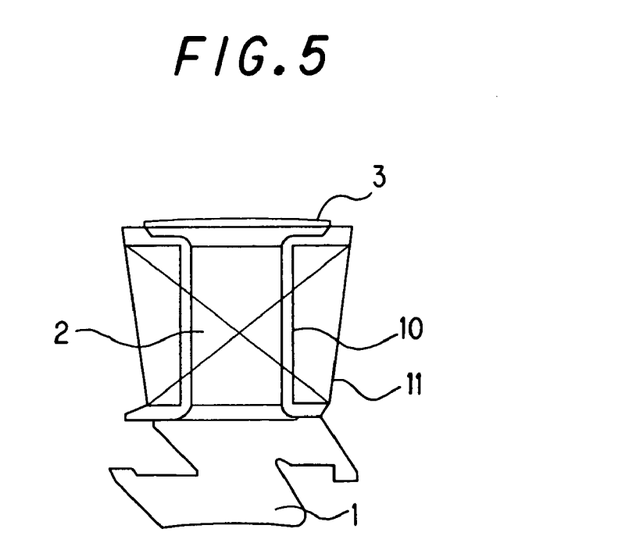
FIG. 5 is a longitudinal sectional view showing a core element with a coil formed thereon.
Figure 6:
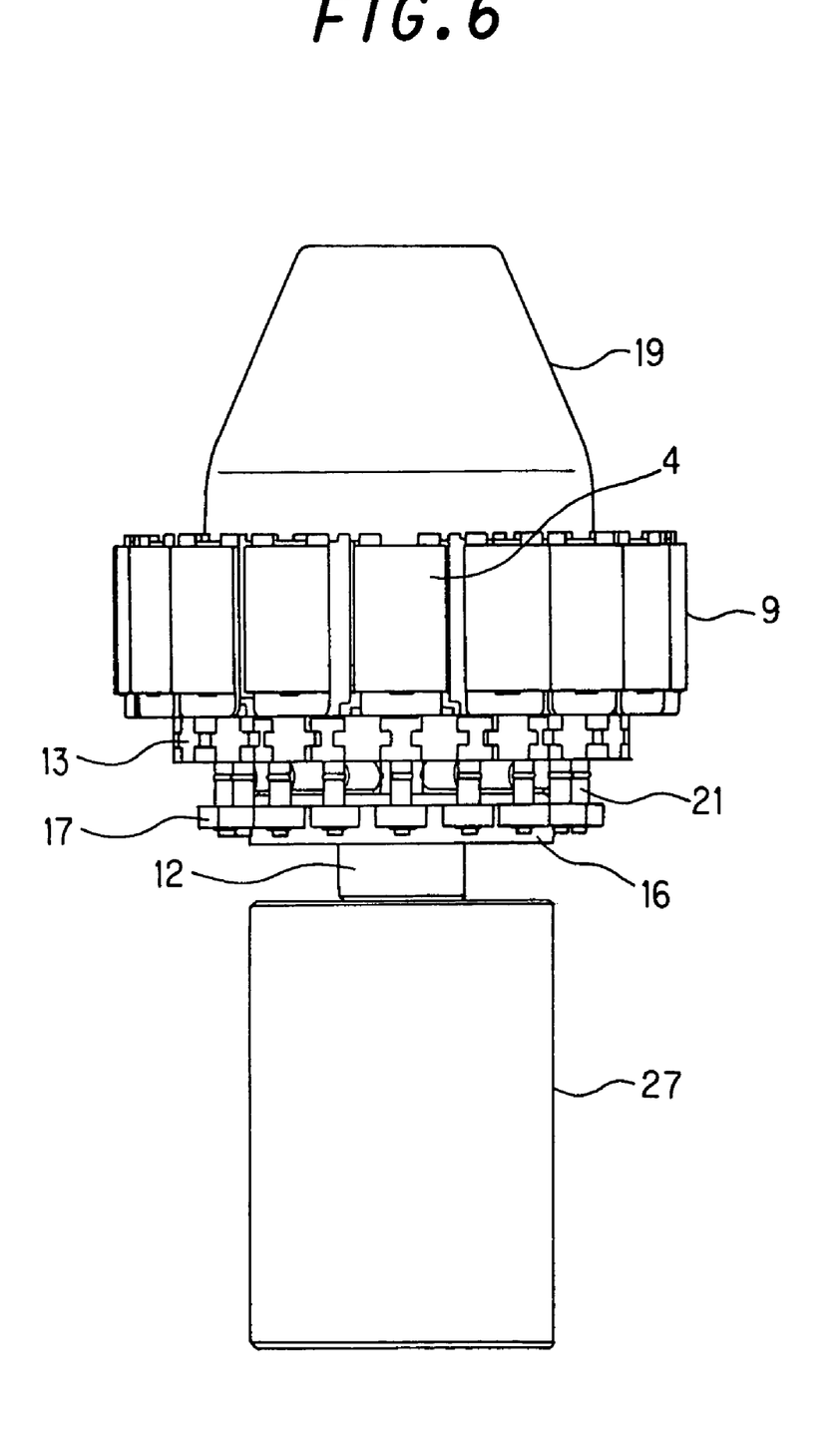
FIG. 6 is a longitudinal sectional view showing a split type stator core winding device according to an embodiment of the present invention.
Figure 7:
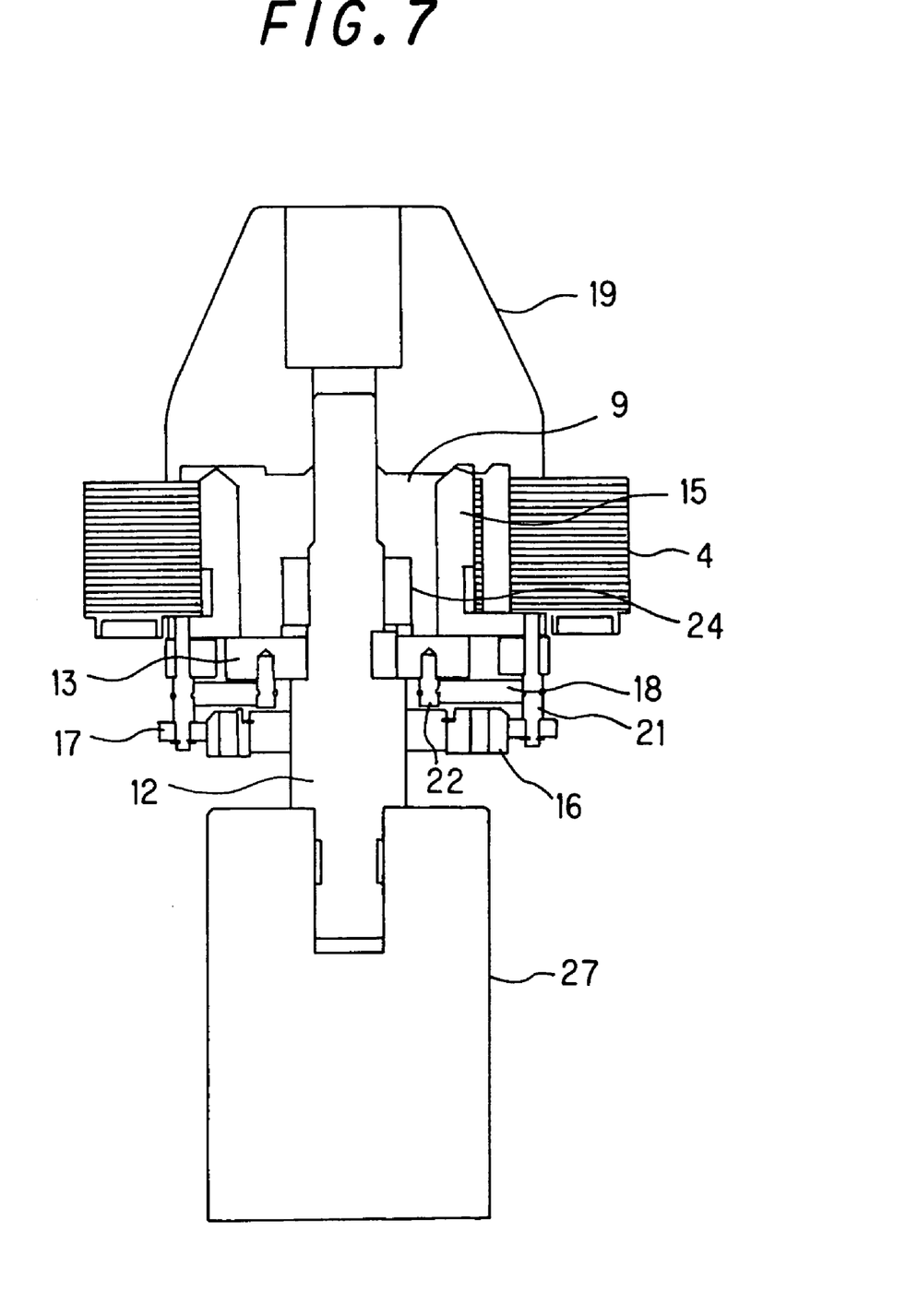
FIG. 7 is a longitudinal sectional view showing a split type stator core winding device according to an embodiment of the present invention.
Figure 8:
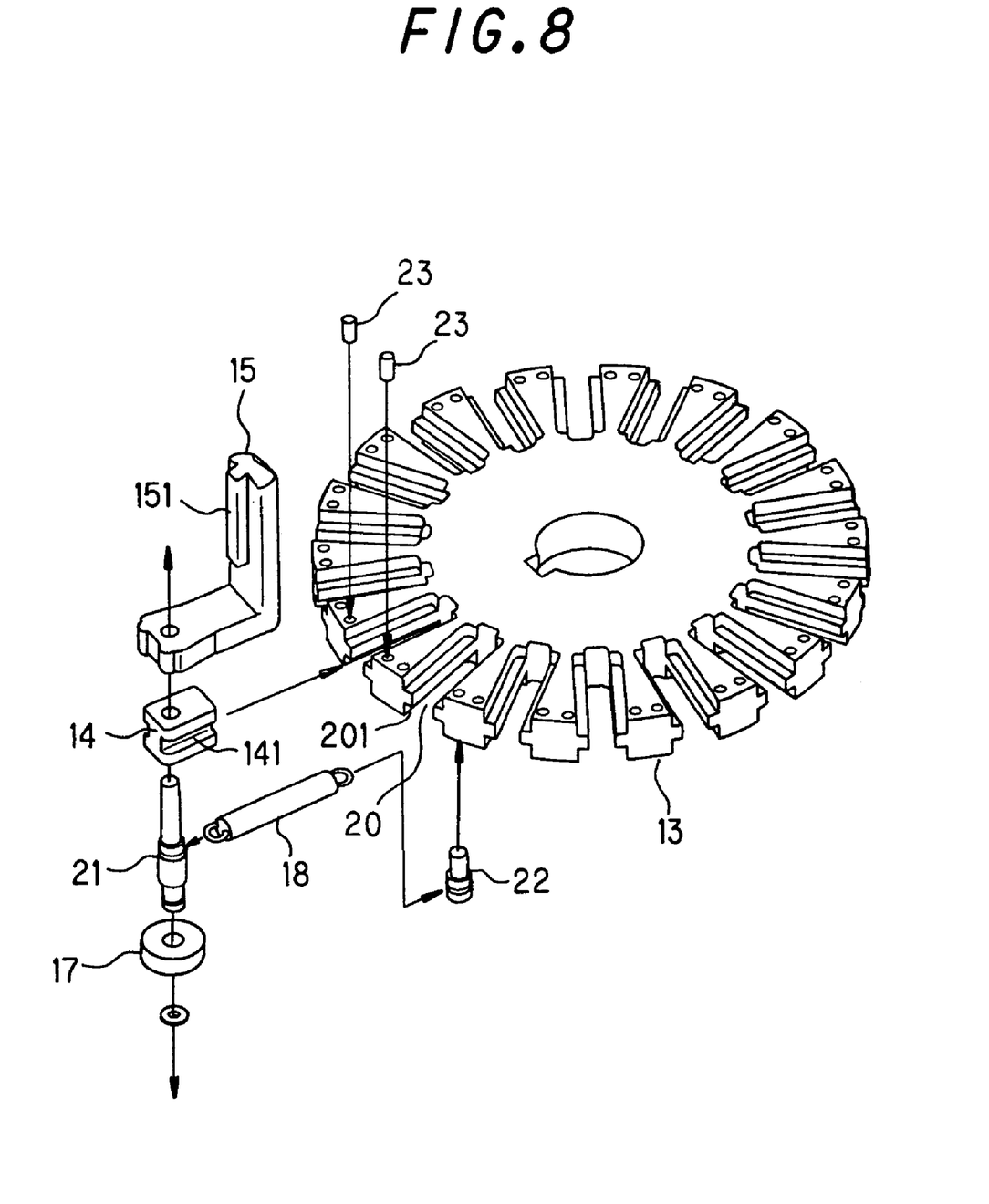
FIG. 8 is a perspective exploded view showing a base support, rod, roller and spring in the embodiment.
Figure 9:
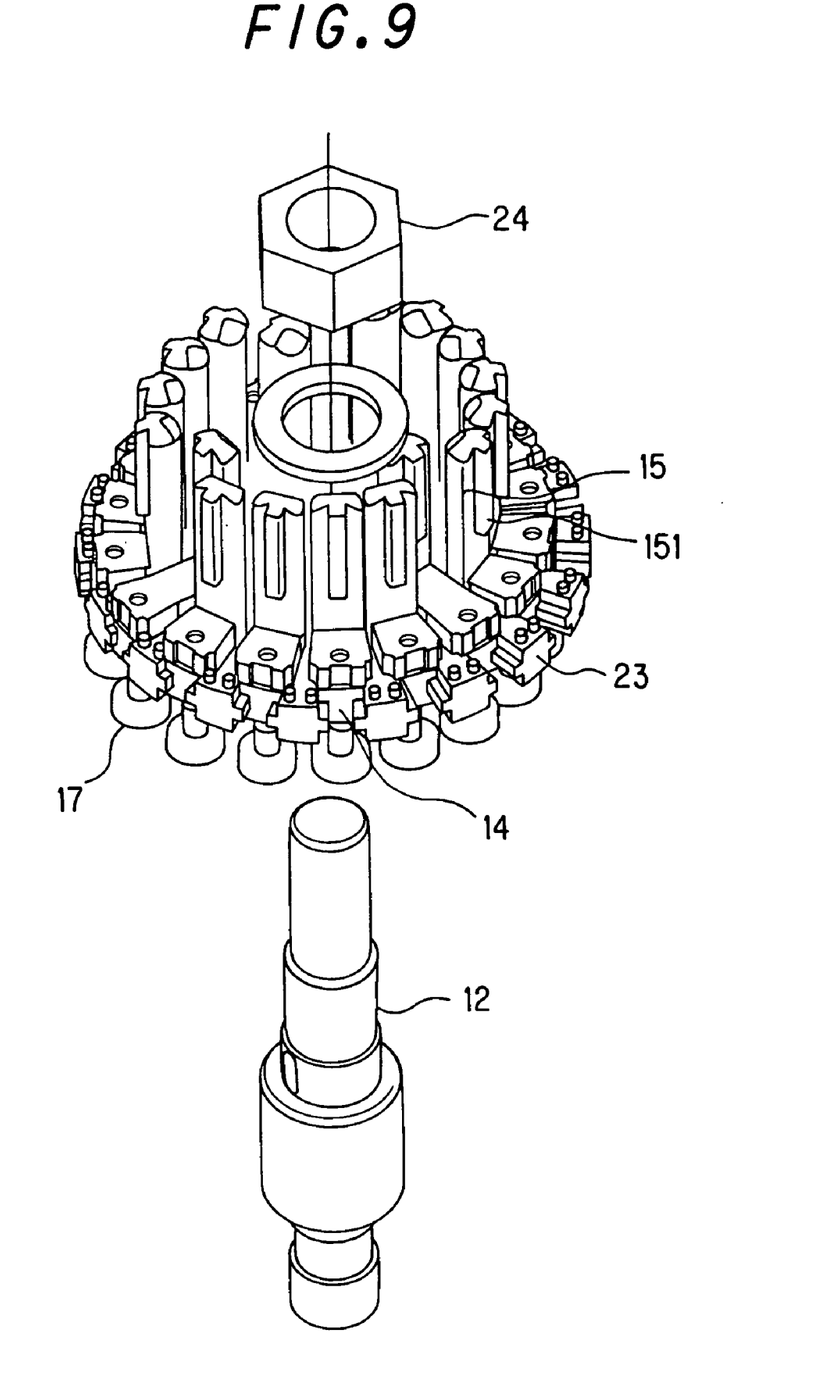
FIG. 9 is a perspective exploded view showing a driving shaft on which a base support, rod, roller and spring are mounted.
Figure 10:
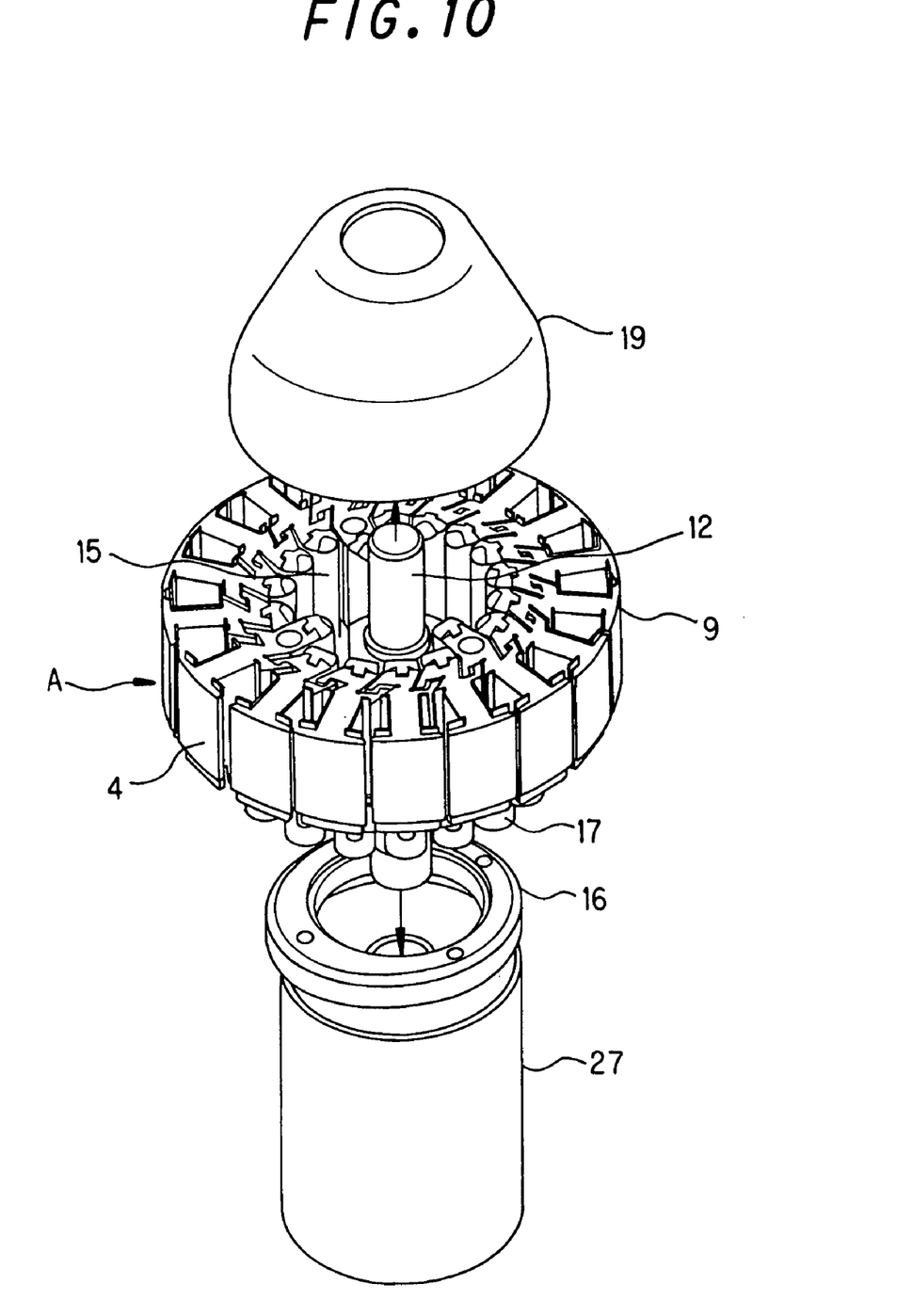
FIG. 10 is a perspective exploded view of a split type stator core winding device according to an embodiment of the present invention.
Figure 11:
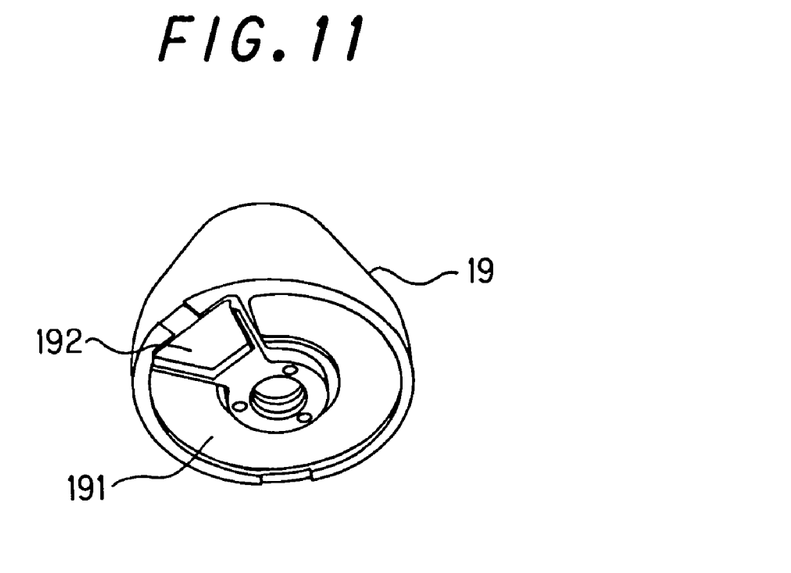
FIG. 11 is a perspective view of a cap when viewing it from the bottom.

As shown in FIGS. 3 and 4, a specified number of core elements 4 are arranged in a ring-shaped state allowing adjacent core elements to move their downward and upward projecting arms 5 and 6 in the circumferential direction so that, when a small force f is applied to the circumference of the core elements, the core elements 4 can be moved toward the center of the circle and assembled at a time in such a way that one core element 4 engages its downward projecting arm 5 with an upward projecting arm 6 of another adjacent element and its upward projecting arm 6 with a downward projecting arm of another adjacent element. This stator core 9 is also featured by providing large claws 3 of core elements to form a reduced gap therein so as to achieve the even distribution of magnetic flux, thereby improving the output power efficiency. However, core elements 4 having large claw parts 3 in the assembled state can not provide gaps enough to freely pass a wire to be wound on each of the core elements. Therefore, these core elements 4 are provided each at its magnetic pole part 2 and claw part 3 with a bobbin 10 having a coil 11 wound thereon in advance and then assembled together followed by connecting windings between the bobbins.

Alternatively, core elements arranged in a line are provided with a specified turns of wire continuously on an element-by-element basis by using a special continuous winding machine disclosed in Japanese Laid-open Patent Publication No. 2002-64962.

The problem to be solved is how to make wind ings of the split type stator core which does not allow windings in the assembled state because gaps formed between claws of core elements are not enough to pass a winding wire.

The prior art method for providing each of the core elements with windings in advance and assembling them into a single stator core requires a large amount of complicated treatment with windings.

The conventional method for making windings of core elements arranged in line requires the use of a special winding machine and requires treatment with windings of the cores and laborious assembling of the core elements into a single stator core unit.

SUMMARY OF THE INVENTION

It is therefore a primary object of the present invention to provide a winding device for use on any conventional winding machine for realizing thereon continuously winding a magnet wire on a split type stator core composed of divided core elements (magnetic pole units) engaging with one another movably in a specified range in the circumferential direction at the yokes and having very small gaps between claws of adjacent elements with no need of employing any special winding machine.

Specifically, the present invention provides a winding device which, in synchronism with rotation of a driving shaft for feeding a stator core per magnet pole (core element) in sequence, works by outward expanding a part of the stator core assembly in which the pushed core element together with neighbors is moved in a specified range in the circumferential direction to enlarge gaps between claws of a target core element and neighbors to allow a wire to be wound around the target element.

PREFERRED EMBODIMENTS OF THE PRESENT INVENTION

A split type stator core winding device according to the present invention is used for continuously winding a copper wire on split type stator cores attached to the driving shaft by feeding the stator core per magnetic pole by feeding the wire through gaps between claws of core elements (magnetic poles) which are movable in a specified range in the circumferential direction. This device has a means which in synchronism with rotation of the driving shaft works by pushing outward a part of the stator core assembly to create wire-passing gaps between a claw of a core element to be wire-wound and claws of its neighbors. Namely, the device can thus create necessary gaps in core elements in sequence in synchronism of the rotation of the driving shaft. This means has components as shown in FIGS. 6 to 10.

The device comprises a circular base 13 integrally mounted on the driving shaft 12, rods 15 attached to a base 13 via a sliding member 14 slidable in the radial direction and abutting against the inside of respective core elements 4 of a split stator core 9, a ring-shaped cam 16 disposed coaxially with the driving shaft 12 and attached to the fixed side, rollers 17 attached to ends of the respective rods 15 rolling on the circumference of the cam 16, springs 18 pressing the respective rollers 17 against the circumference of the cam 16 and a cap 19 holding the stator core 9 on the base 13. When a roller 17 rides on a protruding part of the cam 16, a corresponding rod 15 slides and causes the stator core 9 to partly expand outward.

The base 13 has guide groves 20 formed thereon in radial directions from the centre thereof, which guide corresponding slide members 14 each having a recess 141 in which a protrusion 201 of the groove 20 loosely fits. The rod 15 is pivotably supported on the slide member 14. The spring 18 is suspended between a mounting axis 21 of the roller 17 and a pin 22 provided on the base 13. The base 13 is provided at its periphery with a plurality of pins 23 for positioning the stator core 9 placed on the base 13. The base 13 is secured with a nut 24 onto the driving shaft 12. The cap 19 has a part 191 formed thereon for pressing the stator core 9 to the base 13 and a part 192 formed therein for allowing the partial expansion of the stator core 9.

Figure 12:
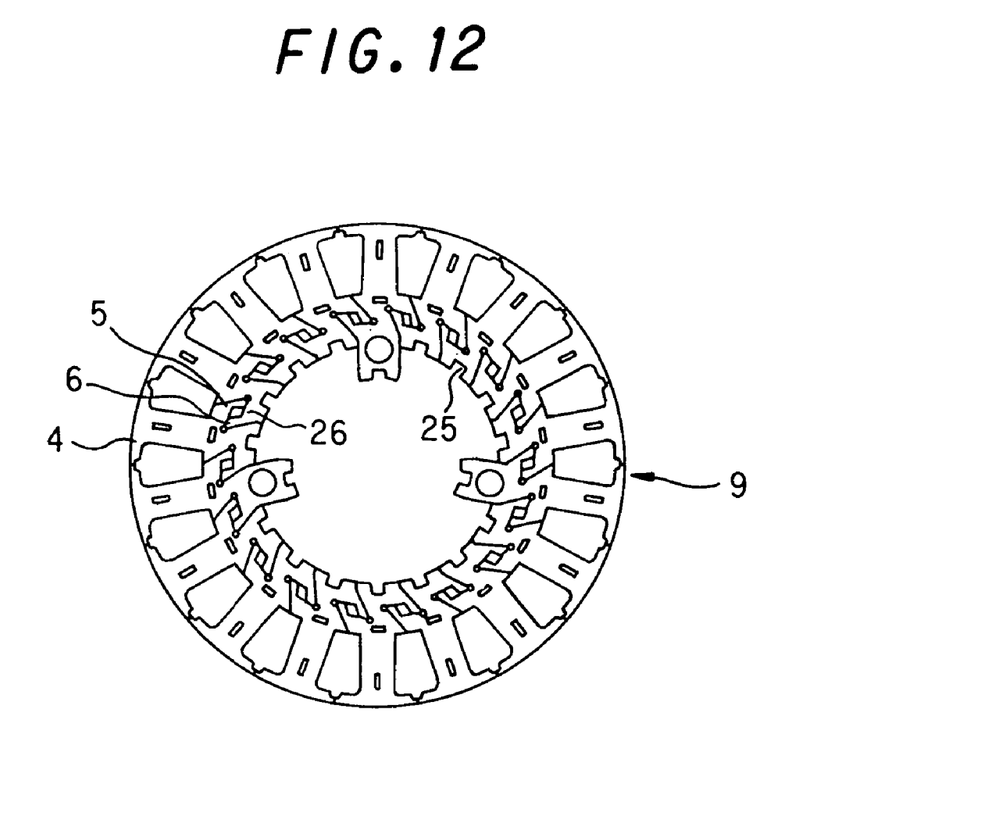
FIG. 12 is a plan view of a split type stator assembled into a single core unit.

FIG. 12 shows a stator core which is similar to that shown in FIG. 4 and which is composed of divided core elements 4 assembled in a single ring-shaped unit in which each element engages with neighbors movably in a specified range in the circumferential direction. In this case, each core element 4 has a yoke part 1 with a grove 25 for fitting therein a protrusion 151 of a rod 15.

Figure 13:
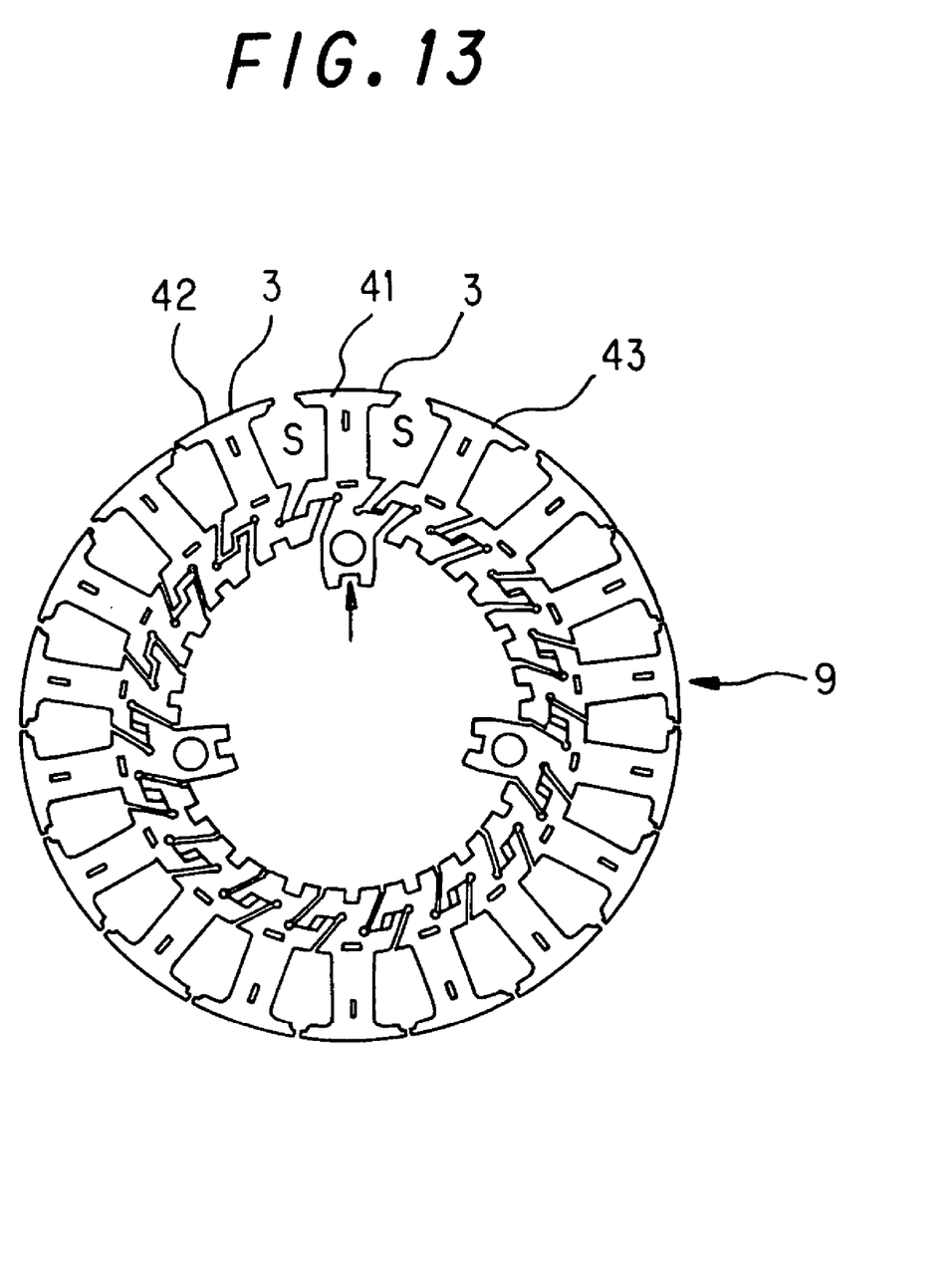
FIG. 13 is a plan view showing a stator core mounted on a base support and partly outward expanded.

FIG. 13 illustrates a stator core 9 in a state partly expanded outward according to the profile of an oval cam 16. In this case, a core element 41 located in a specified position for making the winding is pressed outward to create sufficient wire-passing gaps S between a claw of the element 41 and claws of neighboring elements 42 and 43. The gap S is of not less than 3 mm, which is enough to pass a copper wire to be wound on the core element via the core guide.

As shown in FIG. 13, the stator core 9 is subsequently fed per magnetic pole (on element-by-element basis) along the profile of the cam 16 in the fixed position and a stator core element placed in the winding position (designated on the came profile) is pressed outward and wound with a specified number of wire turns thereon. Thus, the copper wire is continuously wound on each of the core elements 4 in sequence.

When all the core elements 4 of the stator core 9 were wire-wounded, the base 13 with the wire-wound stator core 9 mounted thereon (a part A shown in FIG. 10) is removed from the cam 16 and then the stator core is unitarily assembled by inserting a pin (not shown) into a hole 26 (FIG. 12) formed in a connection part of a downward projection part 5 of a core element 4 with an upward projection part 6 of a neighboring core element 4. The stator core 9 is then removed from the base 13.

The main body of the winding device for winding a copper wire on the stator core 9 may be a conventional one. In the Figures, numeral 27 designates a driving portion of the main body, which drives the driving shaft 12.

As is apparent from the foregoing, the split type stator core winding device according to the present invention can continuously form windings on magnetic poles in sequence by stepwise feeding the stator core per magnetic pole and passing the wire through timely enlarged gaps between craws of core elements, whereby the stator core assembled of core elements having large claws with very small gaps between them for improving the flux distribution characteristic can continuously be wire-wound without using the special winding machine.

What is claimed is:

1. A split type stator core winding device for continuously forming subsequent windings on magnetic pole parts of a stator core attached to a driving shaft by feeding the stator core per magnetic pole and passing a wire through gaps between claws of a target element core and neighbors, wherein the winding device is provided with an expanding means for expanding outward a part of the stator core composed of divided core elements engaging one another as being movably in a specified range in a circumferential direction so as to enlarge a wire-passing gap around a target core element in synchronism with rotation of the driving shaft holding the stator core assembly.

2. A split type stator core winding device as defined in claim 1, wherein the expanding means for expanding outward a part of the stator core comprises a circular base integrally attached to a rotary shaft, plural rods attached to the circular base, said rods each being slidable toward a center of the circular base and each abutting against an inside surface of a core element in opposition, a cam disposed coaxially with the rotary shaft and attached to a fixed side, rollers attached one to an end of each of the rods and movable along on a profile of the cam and a spring forcing the rollers against the profile of the cam, wherein one rod having a roller abutting against a salient part of the cam profile slides and expands outward a part of the stator core.

* * * * *